(12) United States Patent  
Understein

(10) Patent No.: US 6,980,103 B2  
(45) Date of Patent: Dec. 27, 2005

(54) AIRPLANE DISTRESS SYSTEM

(76) Inventor: Norman Understein, P.O. Box 60404, Potomac, MD (US) 20859-0404

( * ) Notice: Subject to any disclaimer, the term of this patent is extended or adjusted under 35 U.S.C. 154(b) by 87 days.

(21) Appl. No.: 10/485,991

(22) PCT Filed: Sep. 20, 2002

(86) PCT No.: PCT/US02/29658

§ 371 (c)(1), (2), (4) Date: Feb. 5, 2004

(87) PCT Pub. No.: WO03/024187

PCT Pub. Date: Mar. 27, 2003

(65) Prior Publication Data

US 2004/0201499 A1 Oct. 14, 2004

Related U.S. Application Data

(60) Provisional application No. 60/323,316, filed on Sep. 20, 2001.

(51) Int. Cl.[7] ............................................. G08B 1/08
(52) U.S. Cl. ..................... 340/539.1; 340/964; 340/945
(58) Field of Search ............................... 340/945, 963, 340/539.1, 539.13; 244/129.5, 220, 221

(56) References Cited

U.S. PATENT DOCUMENTS

| | | | |
|---|---|---|---|
| 4,706,091 A | | 11/1987 | Scott |
| 5,311,197 A | * | 5/1994 | Sorden et al. ............... 342/457 |
| 6,222,480 B1 | | 4/2001 | Kuntman et al. |
| 6,385,513 B1 | | 5/2002 | Murray et al. |
| 6,584,383 B2 | * | 6/2003 | Pippenger ...................... 701/3 |
| 6,641,087 B1 | * | 11/2003 | Nelson .................... 244/118.5 |
| 6,771,186 B1 | * | 8/2004 | Boveja et al. .............. 340/945 |
| 6,904,341 B2 | * | 6/2005 | Kish et al. .................... 701/21 |
| 2003/0225492 A1 | * | 12/2003 | Cope et al. ................... 701/35 |

* cited by examiner

Primary Examiner—Daryl C Pope  
(74) Attorney, Agent, or Firm—Nixon & Vanderhye P.C.

(57) ABSTRACT

An airline distress system is provided for an airplane. The airplane includes a pilot cockpit and a transponder for transmitting signals to an air traffic controller. The airline distress system includes an auxiliary transponder (10) that transmits auxiliary signals to the air traffic controller. The auxiliary transponder is preferably disposed outside of the pilot cockpit and inaccessible to airplane crew and passengers. In one embodiment, a sensor (16) is operatively coupled with the cockpit door, and a switch (20) communicates with the sensor (16) and the auxiliary transponder (10). The auxiliary transponder (10) is configured to be automatically activated by the switch (20) according to a signal from the sensor that the cockpit door has been opened.

20 Claims, 1 Drawing Sheet

AIRPLANE DISTRESS SYSTEM

CROSS-REFERENCES TO RELATED APPLICATIONS

This application is the U.S. national phase of International PCT Application No. PCT/US02/29658, filed Sep. 20, 2002, which designated the U.S. PCT/US02/129658 claims priority of U.S. Provisional Patent Application Ser. No. 60/323,316, filed Sep. 20, 2001. The entire contents of these applications are incorporated herein by reference.

BACKGROUND OF THE INVENTION

The present invention relates to a an airplane distress system and, more particularly, to a distress system to assist in identifying airplanes that have been taken over by presumed hijackers.

Avionics that are currently available and installed in most aircraft include a transponder that transmits a signal to the Air Traffic Control (ATC). Prior to each flight, the pilot is given a discrete 4-digit code. The transponder code is linked to the ATC ground radar system and follows the airplane to its destination. There are certain 4-digit codes that a pilot can tune into the transponder under certain emergency circumstances. Examples include:

7700 Emergency (this code also causes the ATC system to send out an alarm signal)
7600 Communications failure
7500 Hijack situation In the situation that occurred on Sep. 11, 2001, it is understood that none of the airplanes that were taken over had their transponder tuned to 7500. This would mean that the hijackers gained control of the cockpit without time for the pilot to tune the transponder to 7500, or that the hijackers themselves turned off the transponder.

SUMMARY OF THE INVENTION

It thus may be desirable to incorporate a distress system for airplanes including an auxiliary transponder that cannot be deactivated in the pilot cockpit or by any crew member or passenger. Additionally, such a system may be activated upon any unauthorized opening of the cockpit door or upon activation by depressing a panic button or the like.

In an exemplary embodiment of the invention, an airline distress system is provided for an airplane including a pilot cockpit and a transponder for transmitting signals to an air traffic controller. The airline distress system includes an auxiliary transponder that transmits auxiliary signals to the air traffic controller. The auxiliary transponder is disposed outside of the pilot cockpit and inaccessible to airplane crew and passengers. The auxiliary transponder may be configured to emit up to two emergency codes, which are preferably changeable by authorized personnel only. The auxiliary transponder may be configured such that once activated, the auxiliary transponder cannot be deactivated by the airplane crew or passengers.

The pilot cockpit may be secured with a cockpit door, wherein the system further includes a sensor operatively coupled with the cockpit door and communicating with the auxiliary transponder. In this context, the auxiliary transponder may be configured to be automatically activated according to a signal from the sensor that the cockpit door has been opened. The distress system may further include a switch accessible to the pilot coupled with the sensor for activating the sensor. In this context, the switch may be configured also to deactivate the sensor.

In one arrangement, a panic button is accessible to the pilot and communicates with the auxiliary transponder for activating the auxiliary transponder.

In another exemplary embodiment of the invention, a method of operating an airline distress system includes the steps of (a) disposing the auxiliary transponder outside of the pilot cockpit and inaccessible to airplane crew and passengers; (b) activating the auxiliary transponder according to an activate signal; and (c) transmitting auxiliary signals to the air traffic controller.

In still another exemplary embodiment of the invention, the airline distress system includes an auxiliary transponder that transmits auxiliary signals to the air traffic controller, wherein the auxiliary transponder is disposed outside of the pilot cockpit and inaccessible to airplane crew and passengers; a sensor operatively coupled with the cockpit door; and a switch communicating with the sensor and the auxiliary transponder, wherein the auxiliary transponder is configured to be automatically activated by the switch according to a signal from the sensor that the cockpit door has been opened.

BRIEF DESCRIPTION OF THE DRAWINGS

These and other aspects and advantages of the present invention will be described in detail with reference to the accompanying drawings, in which.

DETAILED DESCRIPTION OF THE DRAWINGS

Figure 1:
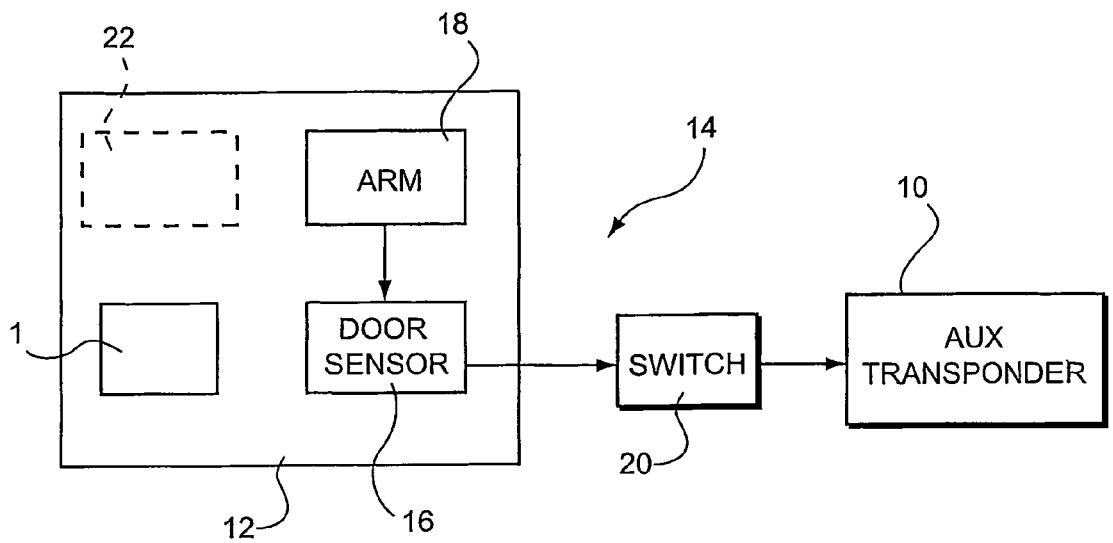
FIG. 1 is an exemplary block diagram of the system according to the present invention.

As noted above, with reference to FIG. 1, conventional aircraft typically include a transponder 1 for emitting signals to ATC. The structure and operation of a conventional transponder do not necessarily form part of this invention, and further details thereof will not be further described. The transponder 1 is accessible to the pilot and co-pilot's for selective activation and deactivation.

The proposed system according to the present invention has two parts. Part one is a separate auxiliary transponder 10 that only emits one or two emergency codes (such as 7700 for several seconds, then 7500 for several seconds) alternatively. In the proposed system, these codes would be able to be changed by ground maintenance crew or avionics specialists if the emergency codes are changed by ATC. Once activated, the auxiliary transponder 10 cannot be turned off by the pilot, and must be turned off by ground maintenance crew. Preferably, the auxiliary transponder 10 should be located outside of the pilot cockpit 12 and not accessible to the pilot, crew or passengers, so it cannot be tampered with by someone wishing to do harm. The auxiliary transponder 10 can be of similar known construction to the original airplane transponder 1.

The second part of the system is an activation device 14 that automatically activates the auxiliary transponder 10 if the pilot cockpit door is opened during flight. Preferably, the pilot arms the activation device 14 after the cockpit door is closed, possibly by a switch or other dedicated circuit 18 near the pilot or co-pilot. The activation device 14 can be disarmed if the pilot or co-pilot needs to open the cockpit door during flight. The door is provided with a known sensor 16, such as a trip switch, optical switch or the like, that outputs a signal when the cockpit door is opened. When armed, any unauthorized entry to the cockpit 12 by opening the door activates the door sensor 16 to open a switch 20 and activate the auxiliary transponder 10.

Additionally or alternatively, the auxiliary transponder 10 can be activated via a "panic" button 22 accessible to either or both the pilot and co-pilot. Preferably, once activated, the auxiliary transponder 10 can only be turned off by ground maintenance crew.

Every pilot has a "checklist" that for each flight. The checklist would remind the pilot to arm the activation device 14 when the pilot first closes the cockpit door. The checklist would also remind the pilot to disarm the activation device 14 after the airplane has landed.

Figure 2:
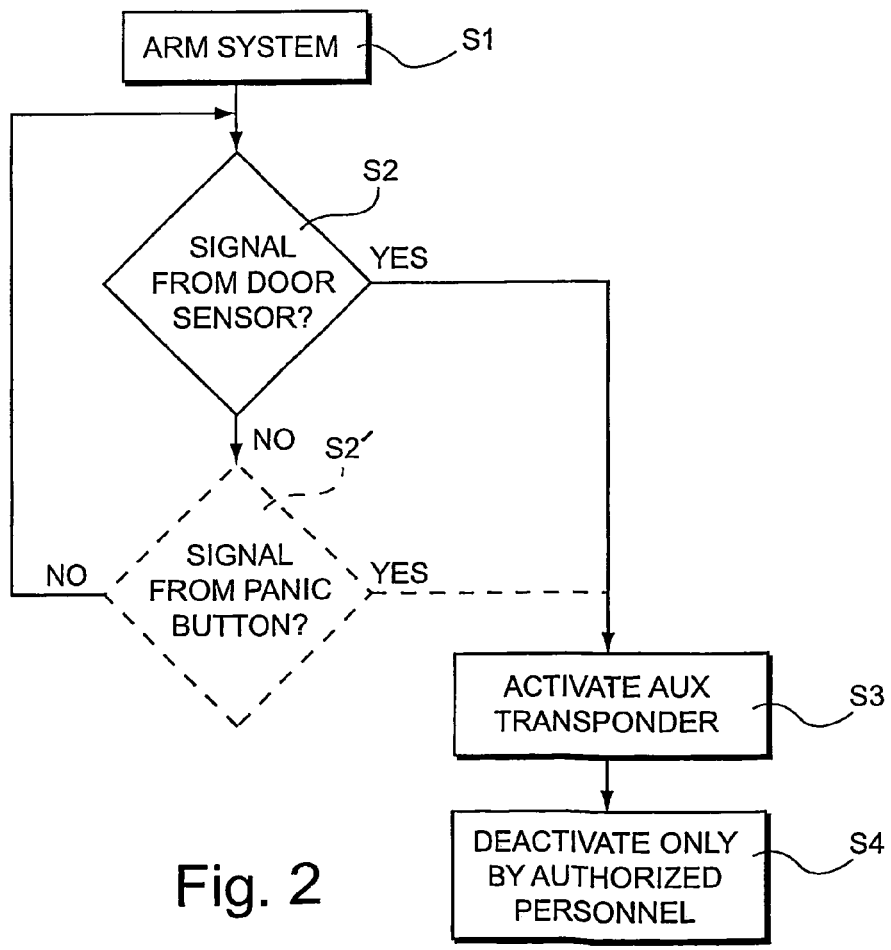
FIG. 2 is a flow diagram of the distress system operating method.

A process carried out by the system of the invention will be described with reference to FIG. 2. In step S1, the distress system of the present invention is armed via the arming switch 18 by the pilot or co-pilot during their pre-flight procedures after they no longer have a need to open the cockpit door. As noted, the pilot and co-pilot can selectively disarm the system via switch 18 if they need to open the cockpit door during flight.

Once armed, the system checks for signals from the door sensor 16 that the cockpit door has been opened in a continuous control loop (S2). If the door sensor 16 detects that the cockpit door has been opened (YES in step S2), the auxiliary transponder 10 is automatically activated by the switch 20 (S3). Subsequently, the auxiliary transponder 10 cannot be accessed by the crew or passengers and can only be deactivated by authorized personnel (S4).

An alternative or additional feature of the invention includes the panic button 22 noted above for activating the auxiliary transponder 10. Step S2' is shown in phantom in FIG. 2. In step S2', the system determines whether the panic button 22 has been depressed in the continuos control loop with the door sensor 16. If the system detects that the panic button 22 has been depressed (YES in step S2'), the auxiliary transponder 10 is activated.

The auxiliary transponder of the invention can be easily and inexpensively implemented into existing aircraft. With the system of the present invention, added airline security is provided by preventing any unauthorized opening of the cockpit door, thereby preventing entry into the cockpit by unauthorized personnel.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An airline distress system for an airplane including a pilot cockpit and a transponder for transmitting signals to an air traffic controller, the airline distress system comprising an auxiliary transponder that transmits auxiliary signals to the air traffic controller, the auxiliary transponder being disposed outside of the pilot cockpit and inaccessible to airplane crew and passengers.

2. An airline distress system according to claim 1, wherein the auxiliary transponder is configured to emit up to two emergency codes.

3. An airline distress system according to claim 2, wherein the two emergency codes are changeable by authorized personnel only.

4. An airline distress system according to claim 1, wherein the auxiliary transponder is configured such that once activated, the auxiliary transponder cannot be deactivated by the airplane crew or passengers.

5. An airline distress system according to claim 1, wherein the pilot cockpit is secured with a cockpit door, the system further comprising a sensor operatively coupled with the cockpit door and communicating with the auxiliary transponder, wherein the auxiliary transponder is configured to be automatically activated according to a signal from the sensor that the cockpit door has been opened.

6. An airline distress system according to claim 5, further comprising a switch accessible to the pilot coupled with the sensor for activating the sensor.

7. An airline distress system according to claim 6, wherein the switch is configured also to deactivate the sensor.

8. An airline distress system according to claim 1, further comprising a panic button accessible to the pilot and communicating with the auxiliary transponder for activating the auxiliary transponder.

9. An airline distress system according to claim 8, wherein the auxiliary transponder is configured such that once activated, the auxiliary transponder cannot be deactivated by the airplane crew or passengers.

10. A method of operating an airline distress system in an airplane including a pilot cockpit and a transponder for transmitting signals to an air traffic controller, the airline distress system having an auxiliary transponder, the method comprising:
    (a) disposing the auxiliary transponder outside of the pilot cockpit and inaccessible to airplane crew and passengers;
    (b) activating the auxiliary transponder according to an activate signal; and
    (c) transmitting auxiliary signals to the air traffic controller.

11. A method according to claim 10, wherein step (c) is practiced by emitting up to two emergency codes.

12. A method according to claim 11, further comprising configuring the auxiliary transponder such that the two emergency codes are changeable by authorized personnel only.

13. A method according to claim 10, further comprising configuring the auxiliary transponder such that once activated, the auxiliary transponder cannot be deactivated by the airplane crew or passengers.

14. A method according to claim 10, wherein the pilot cockpit is secured with a cockpit door, and wherein step (b) is practiced by automatically activating the auxiliary transponder when the cockpit door is opened.

15. A method according to claim 14, further comprising, prior to automatically activating the auxiliary transponder, arming the cockpit door.

16. A method according to claim 15, further comprising enabling the cockpit door to be selectively disarmed.

17. A method according to claim 10, wherein step (b) is practiced by pressing a panic button accessible to the pilot.

18. A method according to claim 17, further comprising configuring the auxiliary transponder such that once activated, the auxiliary transponder cannot be deactivated by the airplane crew or passengers.

19. An airline distress system for an airplane including a pilot cockpit secured by a cockpit door and a transponder for transmitting signals to an air traffic controller, the airline distress system comprising:
    an auxiliary transponder that transmits auxiliary signals to the air traffic controller, the auxiliary transponder being disposed outside of the pilot cockpit and inaccessible to airplane crew and passengers;

a sensor operatively coupled with the cockpit door; and
a switch communicating with the sensor and the auxiliary transponder, wherein the auxiliary transponder is configured to be automatically activated by the switch according to a signal from the sensor that the cockpit door has been opened.

20. An airline distress system according to claim 19, wherein the auxiliary transponder is configured such that once activated, the auxiliary transponder cannot be deactivated by the airplane crew or passengers.

* * * * *